United States Patent [19]

Schmitz

[11] Patent Number: 4,468,609

[45] Date of Patent: Aug. 28, 1984

[54] CONTROL SYSTEM FOR THE DETECTION OF LEAKS IN INSULATED PIPES

[76] Inventor: Friedhelm Schmitz, 4, Schillerweg, 5883 Kierspe, Fed. Rep. of Germany

[21] Appl. No.: 326,403

[22] Filed: Dec. 1, 1981

[30] Foreign Application Priority Data

Dec. 1, 1980 [DE] Fed. Rep. of Germany ....... 3045257

[51] Int. Cl.$^3$ ............................................. G01R 27/26
[52] U.S. Cl. .............................. 324/61 QS; 324/61 P; 324/65 CR; 340/605
[58] Field of Search ............ 324/61 QS, 61 P, 65 CR, 324/61 R, 65 P, 65 R; 340/605; 73/49.1, 40.5 R; 200/61.05

[56] References Cited

U.S. PATENT DOCUMENTS

| | | | |
|---|---|---|---|
| 1,786,843 | 12/1930 | Hedeby | 200/61.05 |
| 2,759,175 | 8/1956 | Spalding | 340/605 X |
| 2,845,790 | 8/1958 | Eddy | 324/65 P |
| 3,485,085 | 12/1969 | Hawkins, Jr. | 324/65 R X |
| 3,794,911 | 2/1974 | Fathauer | 324/61 QS |
| 3,882,382 | 5/1975 | Johnson | 324/65 R |
| 3,986,977 | 10/1976 | Gablin | 324/65 R X |
| 4,044,607 | 8/1977 | Deal | 324/61 QS X |
| 4,114,090 | 9/1978 | Poskitt | 324/61 QS |
| 4,160,948 | 7/1979 | Tytgat et al. | 324/61 P |
| 4,332,170 | 6/1982 | Belval et al. | 340/605 X |

FOREIGN PATENT DOCUMENTS

| | | | |
|---|---|---|---|
| 927492 | 5/1955 | Fed. Rep. of Germany | 73/49.1 |
| 2619042 | 11/1977 | Fed. Rep. of Germany | . |
| 2725224 | 12/1978 | Fed. Rep. of Germany | . |
| 8011887 | 7/1980 | Fed. Rep. of Germany | . |
| 1016928 | 1/1966 | United Kingdom | 73/40.5 R |

Primary Examiner—Stanley T. Krawczewicz
Attorney, Agent, or Firm—Joseph A. Geiger

[57] ABSTRACT

A control system for the detection of leaks in insulation-jacketed pipes having measuring probes, each with two electrodes, arranged at sectional intervals and connected to an evaluation circuit. The technical problem resides in the arrangement of the measuring probes on the cold side of the pipes and in the reliable determination of any incidence of leakage, at the exclusion of long-term fluctuations. The heat insulating jacket forms radially open measuring chambers into which measuring probes are removably insertable. Each measuring probe has a plug connector or connection terminals for the evaluation circuit. The electrodes serve as a frequency-determining element of an oscillator.

12 Claims, 8 Drawing Figures

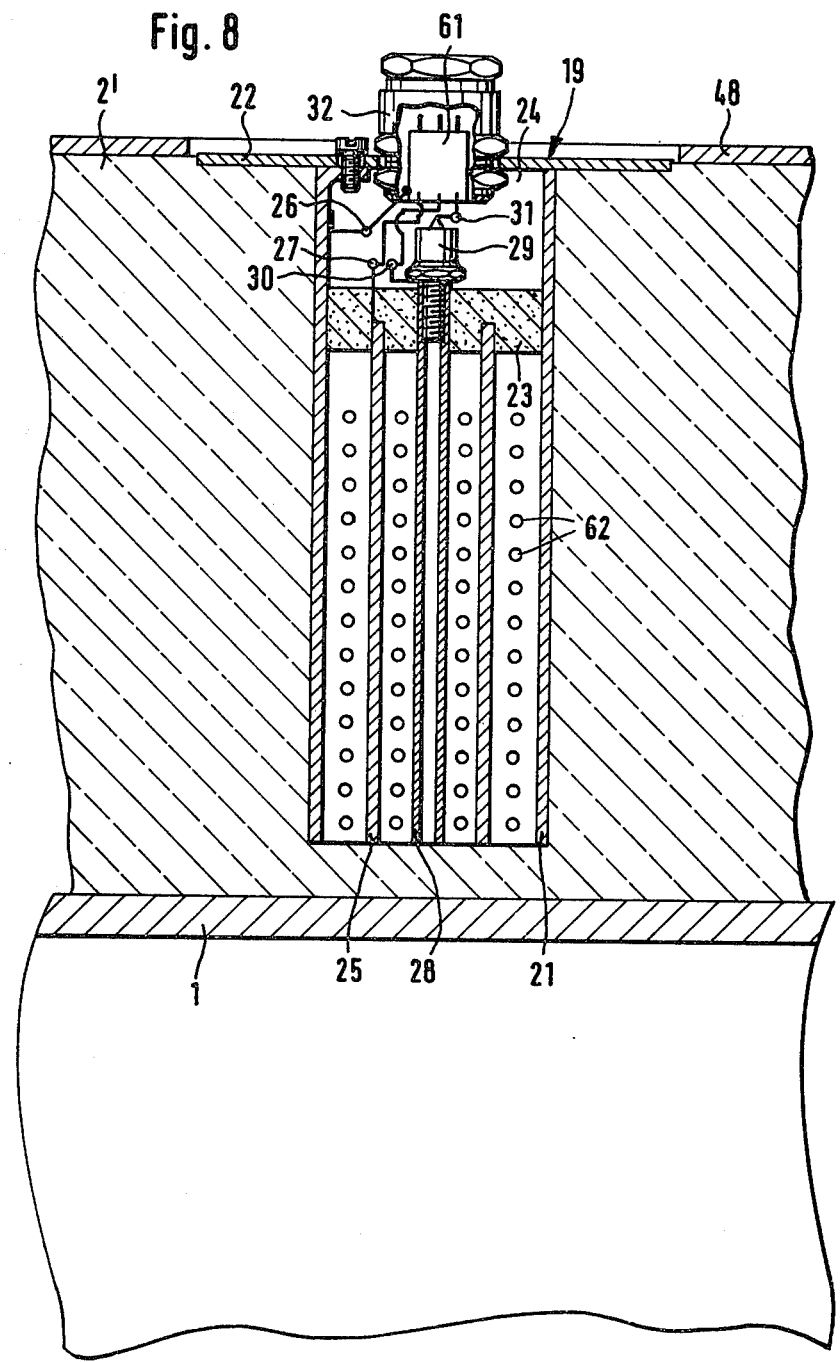

CONTROL SYSTEM FOR THE DETECTION OF LEAKS IN INSULATED PIPES

BACKGROUND OF THE INVENTION

1. Field of the Invention

The present invention relates to a control system for the detection of leaks in insulation-jacketed pipes having measuring probes, each with two electrodes, arranged at sectional intervals and connected to an evaluation circuit.

A control system featuring a measuring conductor in the form of a high-frequency conductor is described in the German Offenlegungsschriften (Publ. Applications) No. 26 19 042 and No. 27 25 224. In the event of leakage, a foil separating the conductors is damaged, so as to alter the attenuation characteristics of the measuring conductor.

A control system of the type described in the introduction is described in U.S. Pat. No. 3,882,382. There, the measuring probe constitutes part of the insulating jacket. The electrodes are connected to an electrical voltage. Leaking fluid is intended to cause a change in the resistance between the electrodes. In connection with the leak detection on steam pipes, it is necessary to fill the space between the electrodes with an electrolyte. Such a control system is unreliable in its response behavior. The use of an electrolyte may lead to malfunction caused by ambient humidity. Furthermore, it may be difficult to ascertain the failure of a measuring probe. A similar control system is described in the German Gebrauchsmuster (Utility Patent) No. 80 11 887. There, leaking fluid is intended to change the resistance of a measuring conductor.

SUMMARY OF THE INVENTION

The objective of the invention is an arrangement of the control system in such a way that the measuring probes can be installed, serviced and replaced from the outside, i.e. from the cold side, and that an instantaneous response to a fluid leak, which produces a change in the dielectric constant in the measuring space, is assured.

According to the invention, this objective is attained by means of the following features:
(a) The heat insulating jacket has radially open measuring chambers;
(b) Measuring probes are removably insertable into the measuring chambers;
(c) Each measuring probe has a plug connector or connection terminals for the evaluation circuit;
(d) The electrodes serve as a frequency-determining element of an oscillator.

This control system responds instantaneously to fluid, especially steam, escaping as the result of a leak. Escaping steam changes the dielectric constant and, consequently, the capacitance of the two electrodes of the measuring probe, thereby changing the frequency of the oscillator. The measuring probe may be installed from the outside of the insulating jacket, so that it can be replaced and serviced during operation. The measuring probes are readily accessible, without the need for interference with the insulating jacket, and they are also readily installable and removable.

More specifically, the invention suggests that the electrodes form part of an oscillator circuit which is connected to a frequency-to-voltage converter, that the exit of the frequency-to-voltage converter be connected to a differentiation stage having a time constant between 0.5 and 10 minutes, and that the differentiated voltage be fed to a threshold circuit controlling an alarm stage and/or a shutdown stage. The differentiation serves to suppress any response triggering action by long-term changes, such as changes resulting from fluctuations in relative humidity and changes which occur under an increase in temperature and the consequent humidity change, when the installation is started up from the cold state.

In conjunction with a cassette-type insulating jacket, the invention suggests the arrangement of peripheral recesses on the axial extremities of the insulating cassettes, so that the peripheral recesses of adjoining insulating cassettes form an annular measuring chamber, the invention further suggesting that the measuring chamber be covered by a metallic clamping collar which has a clamping lever lock and which serves as a first electrode, and that a second electrode is carried by insulating spacers which are attached to the clamping collar. Thus, the clamping collar of the measuring probe also serves as a positioning and mounting means for the insulating cassettes. No other attachment for the insulating cassettes is necessary.

By way of a further embodiment, the invention suggests the arrangement of an opening in the insulating jacket which, in certain cases, may be lined with a receiving tube, so that a measuring probe with an outer sleeve electrode and either an inner sleeve electrode or a pin electrode can be inserted into the measuring chamber formed by the opening. This embodiment makes it especially easy to exchange the measuring probe. The latter can be removed at any time for servicing or cleaning purposes. It is therefore not necessary to shut down the installation, the measuring probe being installable and replaceable during operation of the installation. A measuring chamber of this kind can be arranged in an insulating cassette. Alternatively, it is also possible to establish such a measuring chamber in a previously installed and completed insulating jacket. In this case, an opening forming the measuring chamber is cut into the insulating jacket.

By way of a further improvement, the invention suggests that the sleeve electrodes be, at least in part, perforated. This is to assure that leaking fluid reaches most quickly the measuring space between the sleeve electrodes, even in the case in which the measuring probe is embedded in the insulating material of the insulating jacket.

In order for the measuring probe to be cleanable easily and safely, the invention proposes that the components of the measuring probe be made of non-porous chemically resistant anorganic materials. Such a measuring probe makes it possible to clean and/or decontaminate the probe, even in the event that portions of the measuring probe have been contaminated with poisons, impurities or radioactive substances. The chemical resistance refers to conventional cleaning agents such as acids and lyes. The measuring probe can thus be easily decontaminated.

In order to improve the corrosion resistance and the longevity of the measuring probe, the invention further suggests to select the materials for the measuring probe in such a way that no galvanic couple is formed.

In order to obtain an immediate response to a leak, the invention suggests the arrangement within the insulating jacket of radially or axially oriented expansion channels with passages leading to the measuring space.

As a protection against a false alarm and a false shutdown of the system, the invention also suggests the monitoring of an independent second operating condition through the arrangement, in the measuring space, of a temperature sensor which produces a temperature-reflective signal voltage.

According to the present invention, the evaluation circuit for this temperature sensor is so arranged that the temperature sensor is connected to a differentiation stage, the exit of which leads to a threshold circuit which, in turn, is connected to an alarm stage and/or a shutdown stage.

Lastly, the invention suggests a combined evaluation of the signals from the measuring electrodes and from the temperature sensor in such a way that the exits of their respective threshold circuits are joined in an OR-gate to which is connected an alarm and/or a shutdown stage.

The control system of the invention responds very rapidly to all changes in the measurement values which are indicative of a leak in the pipe system. The two independent measurement values are combined in such a way that the mere deviation of one measurement value already produces a signal. The suppression of long-term changes or of slowly progressing changes assures that a slow change of the measurement values during startup operation produces no signal, as the dielectric constant changes only slowly, whereby the signal change occurring during the preset time constant is insufficient to trigger the threshold circuit. The same conditions apply for a slow temperature increase during the startup operation. Alongside and independently of the signaling of an alarm, the invention also offers a shutdown function by means of which it is possible to shut down the entire installation.

BRIEF DESCRIPTION OF THE DRAWINGS

In the following, several embodiments of the invention will be explained in more detail with reference to the accompanying drawing in which

FIG. 8 shows still another embodiment of a measuring probe.

DESCRIPTION OF THE PREFERRED EMBODIMENTS

Figure 1:
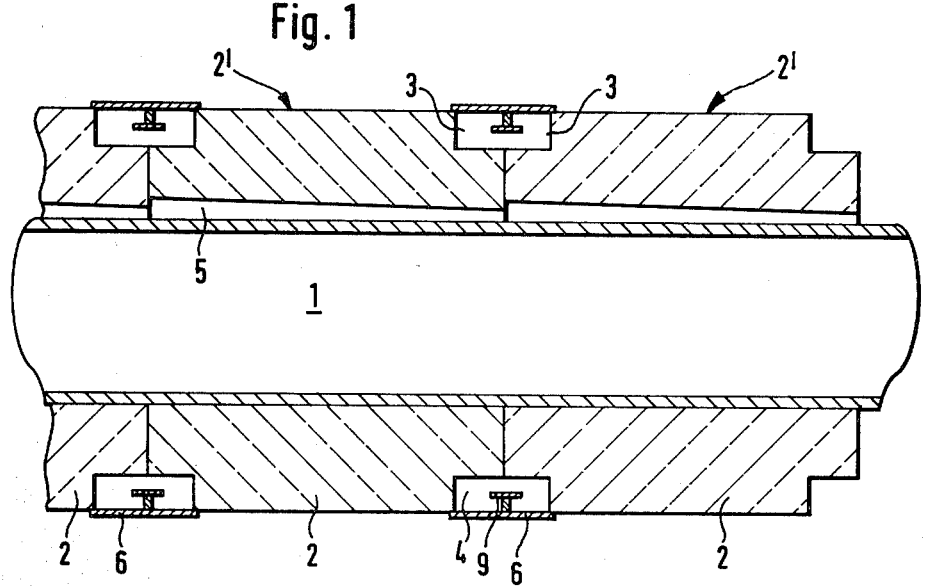
FIG. 1 is a longitudinal cross section through a pipe with an insulating jacket and a first embodiment of a measuring probe.
Figure 2:
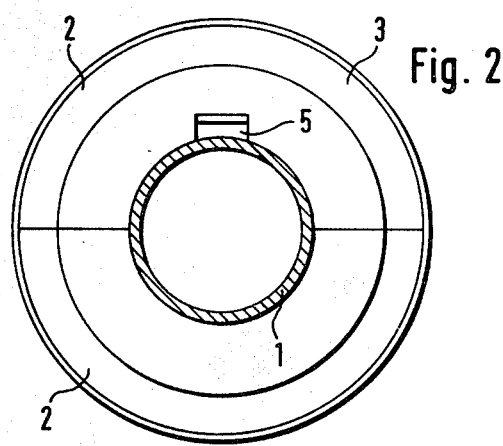
FIG. 2 is a cross section of the pipe of FIG. 1.

In FIGS. 1 and 2 is shown a conduit or pipe 1 which may be a steam pipe in a nuclear power station, for example. The pipe 1 is insulated against heat loss by means of a heat insulating jacket 2′. This heat insulating jacket is composed of insulating cassettes 2 which contain an insulating packing.

The insulating cassettes 2 have arranged on their axial extremities an outer peripheral recess 3, so that between every two adjoining insulating cassettes there is formed a measuring chamber 4. An axially extending channel 5 serves as an expansion space for any fluid that may leak from the pipe 1, so that the leaking fluid will reach the measuring chamber 4 as quickly as possible.

Figure 3:
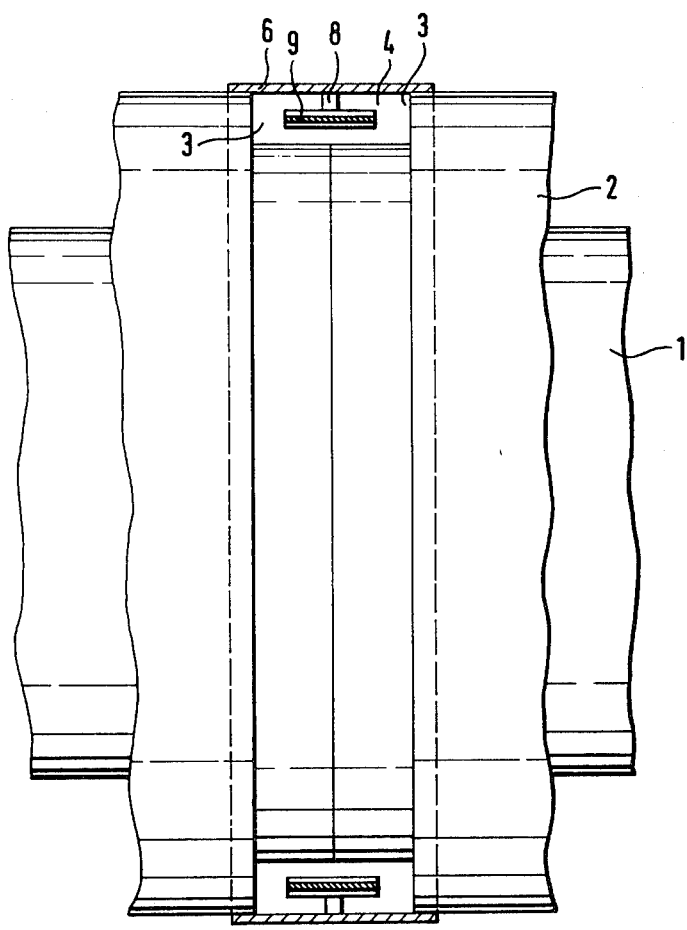
FIG. 3 shows the measuring probe of FIG. 1 at an enlarged scale.
Figure 4:
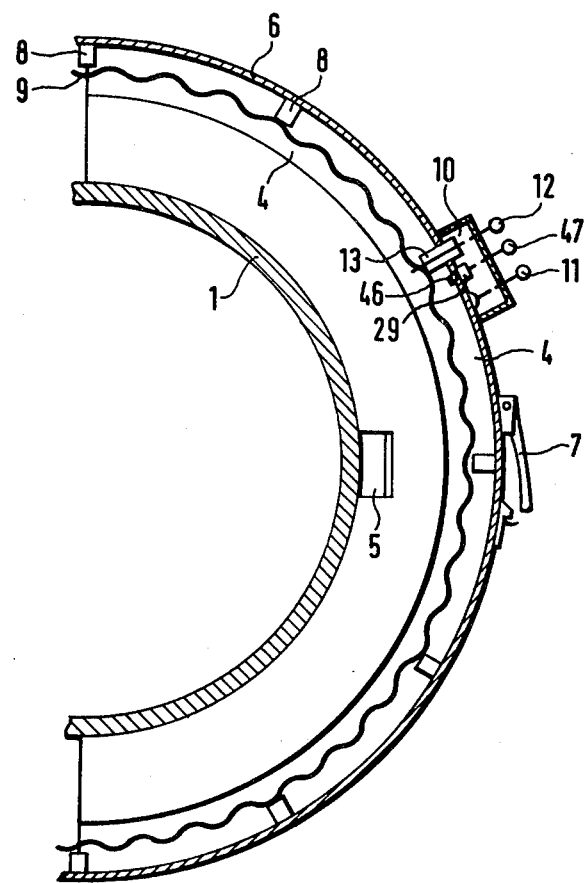
FIG. 4 is a cross section through the measuring probe of FIG. 3.

A measuring probe in the form of an annular probe, shown in detail in FIGS. 3 and 4, comprises a clamping collar 6 with a clamping lever lock 7. The clamping collar 6 holds the insulating cassettes 2 together, making unnecessary any additional attachment or connection between the insulating cassettes. The metallic clamping collar 6 also serves as an electrode. The clamping collar 6 carries on its inner side a flexible band 9, likewise of metal, which is spaced from the clamping collar 6 by means of a series of insulating spacers 8. The flexibility of the metallic band 9 allows the latter to adapt itself to the annular measuring chamber 4, as defined by the diameter of the pipe 1. Instead of being a corrugated band, the second electrode may also consist of electrode sections.

On the clamping collar 6 is arranged a connection box 10 with a connecting terminal 11 leading to the clamping collar 6 and a connecting terminal 12 leading to the corrugated band 9, via an insulating sleeve 13. To the connecting terminals 11 and 12 is connected a measuring cable 14 which leads to an evaluation circuit 15, shown in FIG. 7. The electrical connections may also be combined in a connector jack into which the measuring cable can be plugged in. The evaluation circuit 15 will be explained in more detail further below.

In the connection box 10 is further arranged a temperature-responsive diode or thermodiode 29 which is screwed into the clamping collar 6 by means of an attachment stud 46. The attachment stud 46 and the casing of the thermodiode have good heat conductivity so that the thermodiode measures the temperature of the measuring space. The thermodiode 29 is likewise connected to the evaluation circuit by means of a connecting terminal 47.

The two electrodes formed by the clamping collar 6 and the flexible band 9 constitute a capacitor the capacitance of which is used in an oscillator circuit. When leaking steam reaches the space between the two electrodes 6 and 9, the dielectric constant between the electrodes changes abruptly, thereby producing a change in the natural frequency of the oscillator circuit containing the capacitor. It is thus possible to obtain a voltage change from a measurement of the oscillator frequency.

The measuring probe is installed on the cold side of the insulating jacket, so that work on the measuring probe for purposes of servicing and/or repair can be performed at all times. This is particularly important in connection with decontamination.

Figure 6:
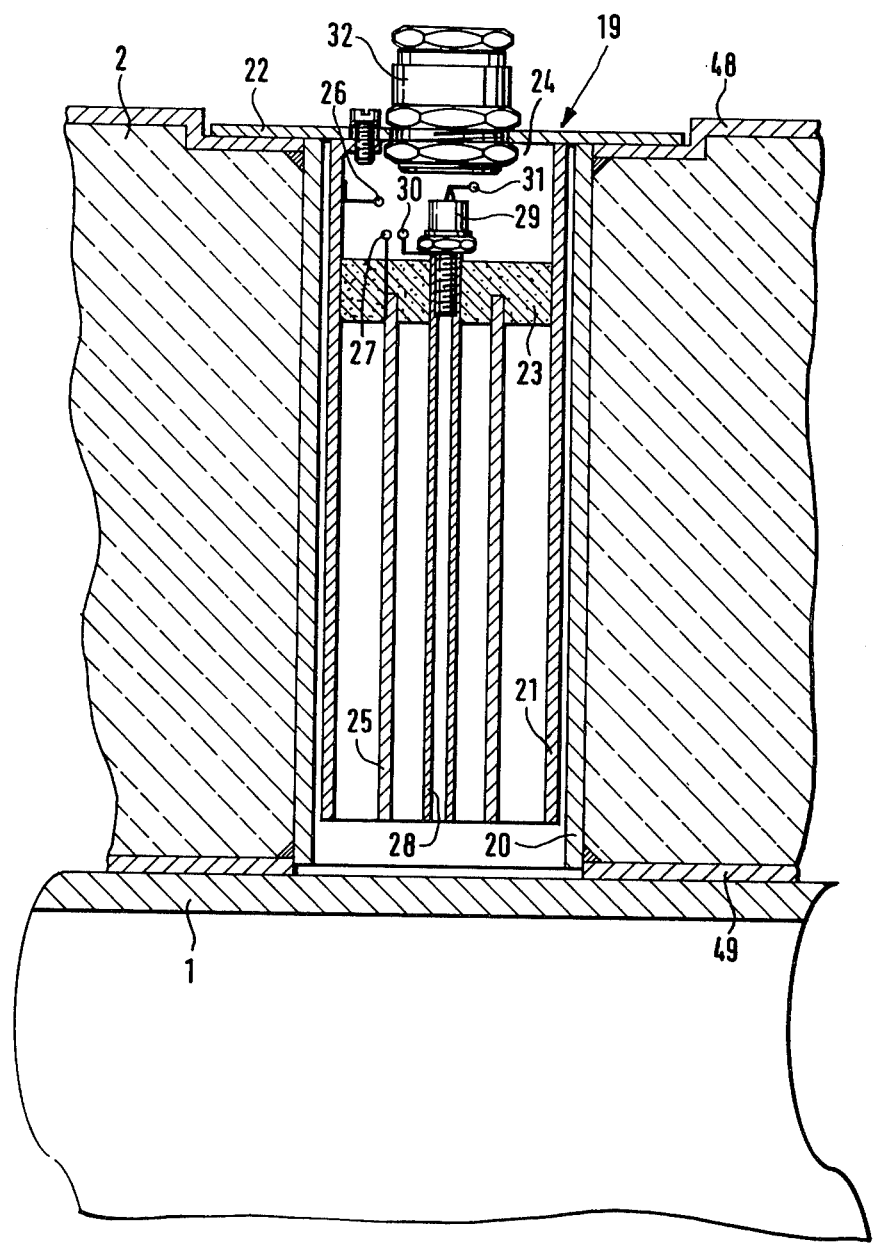
FIG. 6 shows a further embodiment of a measuring probe.

Another embodiment of a measuring probe 19 is illustrated in FIG. 6. In an insulating cassette 2 is arranged a receiving tube 20 which extends from the outer jacket wall 48 through the insulating cassette 2 as far as the inner jacket wall 49. The measuring probe 19 includes an outer sleeve 21 of an outer diameter that corresponds to the inner diameter of the receiving tube 20. On one extremity, the outer sleeve 21 is closed by means of a cover flange 22. In the outer sleeve 21 is arranged an insulating plate 23, for example a ceramic plate, which closes off a connection chamber 24. Inside the outer sleeve 21 is mounted an inner sleeve 25 or a rod-shaped core. The outer sleeve 21 and the inner sleeve 25 consist of a metallic material and serve as electrodes. These electrodes are connected to the connecting terminals 26 and 27 in the connection chamber 24.

Inside the measuring probe is arranged a sensing tube 28 which serves as a temperature sensor. The same can also be used as an electrode. The sensing tube 28 extends through the insulating plate 23 and has heat contact with a thermodiode 29. The temperature sensing device has corresponding connecting terminals 30 and 31. A threaded sleeve assembly 32 forms a closure for the connection chamber 24. The measuring probe 19 is retained in the received tube 20 by means of a quick-release attachment, for example a ball detent (not shown).

FIG. 8 shows a modified embodiment of a measuring probe. The insulating jacket in this case has been completely prefabricated. In order to install a measuring probe, an opening is cut into the insulating jacket. The measuring probe is inserted into this opening, whereby its outer sleeve 21 is in direct contact with the insulating jacket. The outer sleeve has perforations in the form of bores 62 so that leaking fluid reaches the measuring chamber as quickly as possible. The connecting terminals are connected to the sleeves of a connector jack 61 into which can be inserted a matching plug of the measuring cable.

Figure 5:
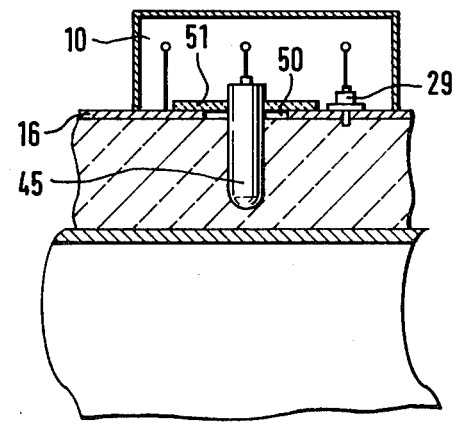
FIG. 5 shows a different embodiment of a measuring probe.

FIG. 5 shows a further embodiment of a measuring probe. Inside a connection box 10 is arranged an opening 50 through the outer jacket wall 16. The opening 50 allows for the insulated introduction of a pin electrode 45 which may be held in place by means of an insulating disc 51, for example. Corresponding connections are provided accordingly.

The measuring probe 19 has its open extremity facing towards the wall of the pipe 1, so that leaking fluid is detected immediately. Leaking steam, leaking water, or leaking condensate rapidly change the dielectric constant $\epsilon$ between the outer sleeve 21 and the inner sleeve 25. In response to this change $\Delta\epsilon$, the measuring cable 14 of FIG. 7 receives a signal f(c) in the form of an oscillation whose frequency is a function of the dielectric constant, the capacitor formed by the sleeve electrodes 21 and 25 being part of an oscillator circuit. This signal is converted into a measurement voltage u by means of a frequency-to-voltage converter 33. In a differentiation stage 34, the voltage signal u is differentiated with a time constant of between 0.5 and 10 minutes. Via a filter circuit 35, the differentiated signal reaches a threshold circuit 36. The differentiation stage 34 makes it possible to filter long-term fluctuations from the measurement signal. Such long-term fluctuations may be the result of changes in the ambient humidity or of humidity changes occurring during the startup of the installation. The signal of the threshold circuit 36 is available directly at its exit $Y_1$, and it can be used to control a central shutdown circuit.

The temperature sensor produces a response to a temperature change $\Delta T$. A measuring cable 14 transmits a temperature-reflective voltage U(T) to a differentiation stage 37. The latter operates likewise with a time constant. Via a filter circuit 38, the signal controls a threshold circuit 39. The entire measuring device is supplied from a source of current 40. The temperature-reflective signal is available at a second exit $Y_2$ for further use.

Figure 7:
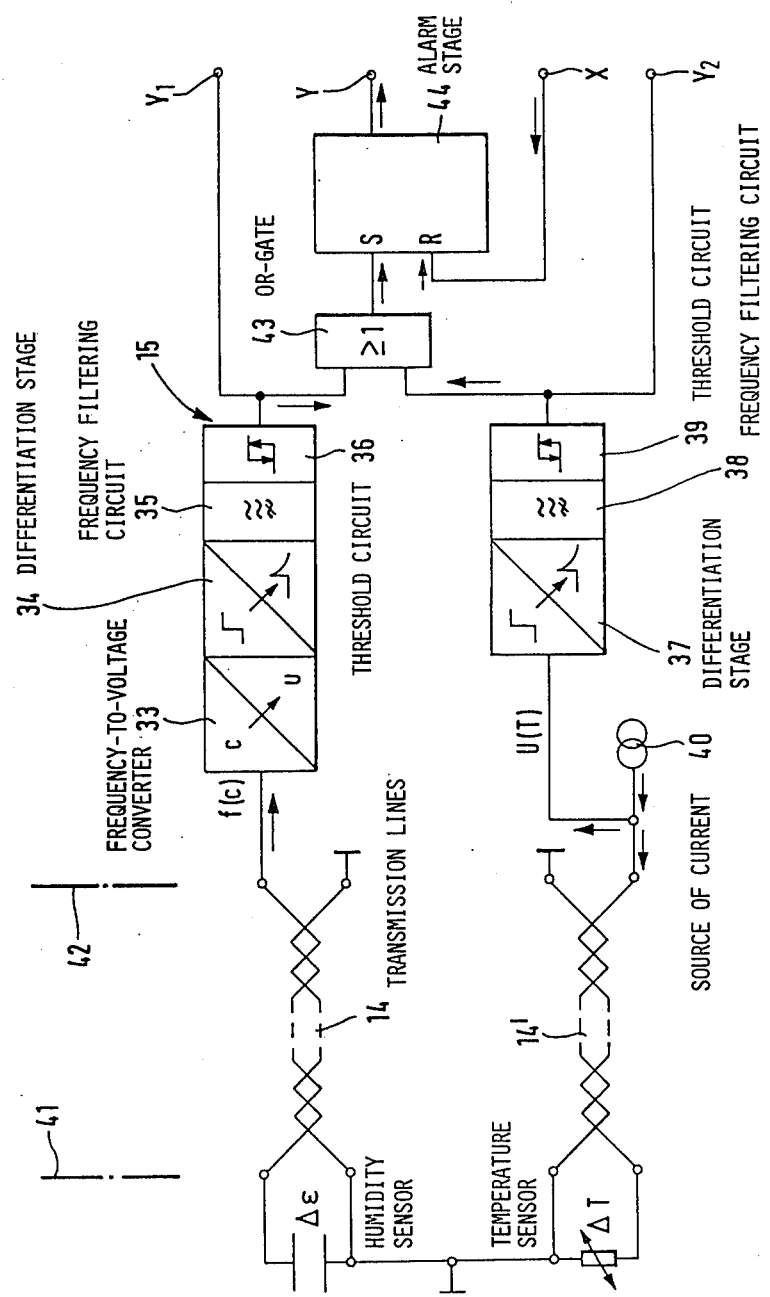
FIG. 7 shows a control system with an evaluation circuit.

Within the diagram of FIG. 7, the stippled lines 41 and 42 separate the area of the measuring probes from the area of the evaluation circuit. The measuring probes are connected to the evaluation circuits over short lines. In each case, a number of evaluation circuits are joined together to form a subassembly. The exits of the evaluation circuits are connected to a central electronic control unit.

At the exits of the threshold circuits 36 and 39 are available two independent signals. The latter may be combined in accordance with different evaluation functions. For example, the two signals may be fed to an OR-gate 43 which triggers an alarm stage 44 and/or a suitable shutdown stage.

The invention thus permits the effective central monitoring of a pipe system, especially one of the type which is used in a steam generating installation. Numerous measurement points may be arranged along the pipe system. Groups of measurement points are connected to evaluation circuits. The latter are linked to a central evaluation circuit, where the condition of the individual measurement points and any alarm signals are registered. This makes it possible to centralize the reception of any trouble signals and of the shutdown controls.

The measuring probes are constructed of anorganic resistant materials, especially materials which are resistant to cleaning bath solutions. The materials of the measuring probe may be selected in such a way that the formation of a galvanic couple within the measuring probe is precluded. This makes it impossible for galvanic damage to occur in the measuring probe, even in the case of a humid environment.

I claim the following:

1. A control system for the detection of leaks in insulation-jacketed pipes having measuring probes, each with two electrodes, arranged at sectional intervals and connected to an evaluation circuit, characterized by the following features:
    (a) the heat insulating jacket (2') has radially open measuring chambers (4);
    (b) measuring probes are removably insertable into the measuring chambers (4);
    (c) each measuring probe has connection (means 61, 11, 12, 47) for the evaluation circuit; and
    (d) the electrodes serve as a frequency-determining element in an oscillator.

2. A control system in accordance with claim 1, characterized in that the insulating cassettes (2) of the insulating jacket have peripheral recesses (3) on their axial extremities so that the peripheral recesses (3) of adjoining insulating cassettes form an annular measuring chamber (4), that the measuring chamber (4) is covered by a metallic clamping collar (6) which has a clamping lever lock (7) and which serves as a first electrode, and that a second electrode (9) is carried by insulating spacers (8) which are attached to the clamping collar (6).

3. A control system in accordance with claim 2, characterized in that the second electrode (9) is a flexible electrode.

4. A control system in accordance with claim 1, characterized in that the insulating jacket has an opening and that a measuring probe (19) with an outer sleeve electrode (21) and an inner electrode (45) is inserted into the measuring chamber formed by said opening.

5. A control system in accordance with claim 1, characterized in that inside the measuring chamber (4) is arranged a temperature sensor (28,29) which produces a temperature-reflective signal voltage.

6. A control system in accordance with claim 4, characterized in that the electrodes are, at least in part, perforated.

7. A control system in accordance with one of claims 1 through 6, characterized in that the components of the measuring probe consist of non-porous chemically resistant anorganic materials.

8. A control system in accordance with claim 7, characterized in that the materials for the measuring probe are selected in such a way that they do not form a galvanic couple.

9. A control system in accordance with one of claims 1 through 6, characterized in that the insulating jacket has arranged within it expansion channels (5) which have passages to the measuring space (4).

10. A control system in accordance with one of claims 1 through 6, characterized in that the evaluation circuit comprises a frequency-to-voltage converter (33), that the exit of the frequency-to-voltage converter is connected to a differentiation stage (34) with a time constant between 0.5 and 10 minutes, and that the differentiated voltage is connected to a threshold circuit (36) which is linked to an alarm stage (44).

11. A control system in accordance with claim 10, characterized in that the temperature sensor is connected to a differentiation stage (37) and that the exit of the latter is connected to a threshold circuit (39) which is linked to an alarm stage (44).

12. A control system in accordance with claim 11, characterized in that the exits of the theshold circuits (36,39) are joined through an OR-gate (43) to which is connected an alarm stage (44).

* * * * *